United States Patent
Weidlich

(10) Patent No.: US 7,085,018 B1
(45) Date of Patent: Aug. 1, 2006

(54) METHOD FOR ENGRAVING PRINTING CYLINDERS

(75) Inventor: Ernst-Rudolf Gottfried Weidlich, Kiel (DE)

(73) Assignee: Hell Gravure Systems GmbH, Kiel (DE)

(*) Notice: Subject to any disclaimer, the term of this patent is extended or adjusted under 35 U.S.C. 154(b) by 1068 days.

(21) Appl. No.: 10/049,466

(22) PCT Filed: Oct. 12, 2000

(86) PCT No.: PCT/DE00/03581

§ 371 (c)(1),
(2), (4) Date: Feb. 12, 2002

(87) PCT Pub. No.: WO01/31911

PCT Pub. Date: May 3, 2001

(30) Foreign Application Priority Data

Oct. 19, 1999 (DE) ................................ 199 50 278

(51) Int. Cl.
*H04N 1/407* (2006.01)
*B41C 1/02* (2006.01)
*G06F 19/00* (2006.01)

(52) U.S. Cl. .................... 358/3.29; 358/406; 700/173; 700/193; 702/105

(58) Field of Classification Search ................ 358/3.29, 358/3.32, 406, 504, 1.9; 700/173, 193; 702/85, 702/105
See application file for complete search history.

(56) References Cited

U.S. PATENT DOCUMENTS

| | | | |
|---|---|---|---|
| 3,885,422 A | 5/1975 | Dini | |
| 4,003,311 A | 1/1977 | Bardin | |
| 4,672,466 A | 6/1987 | Schimpf | |
| 5,422,958 A | 6/1995 | Wouch et al. | |
| 5,438,422 A * | 8/1995 | Holowko et al. | 358/3.29 |
| 5,440,398 A * | 8/1995 | Holowko et al. | 358/3.29 |
| 5,617,217 A | 4/1997 | Brewer et al. | |
| 5,663,802 A | 9/1997 | Beckett et al. | |
| 5,737,090 A * | 4/1998 | Christopher et al. | 358/3.29 |
| 5,737,091 A * | 4/1998 | Holowko et al. | 358/3.29 |
| 5,831,746 A | 11/1998 | Seitz et al. | |
| 6,348,979 B1 * | 2/2002 | Flannery et al. | 358/1.9 |
| 6,362,899 B1 * | 3/2002 | Flannery et al. | 358/1.9 |
| 6,540,453 B1 * | 4/2003 | Lubcke | 358/3.29 |
| 6,614,558 B1 * | 9/2003 | Christopher et al. | 358/3.29 |
| 6,940,622 B1 * | 9/2005 | Weidlich | 358/3.29 |
| 2002/0135811 A1 * | 9/2002 | Flannery et al. | 358/3.29 |

FOREIGN PATENT DOCUMENTS

| | | |
|---|---|---|
| DE | 197 17 990 A1 | 11/1997 |
| EP | 0 595 324 A1 | 5/1994 |
| EP | 0 604 941 A2 | 7/1994 |
| WO | WO 99/51438 | 10/1999 |

* cited by examiner

*Primary Examiner*—Scott A. Rogers
(74) *Attorney, Agent, or Firm*—Schiff Hardin LLP

(57) ABSTRACT

In a method for engraving printing cylinders in an electronic engraving machine, printing densities are matched in individual engraving lanes by engraving cups in the printing lanes with which the prescribed characteristic rated printing densities are to be achieved. The actual printing densities are identified by measurement after the printing. A corrected lane calibration is derived for the respective engraving lane from deviations between the rated printing densities and the actual printing densities. The allocated corrected lane calibration is applied in the engraving lanes.

11 Claims, 8 Drawing Sheets

METHOD FOR ENGRAVING PRINTING CYLINDERS

BACKGROUND OF THE INVENTION

The invention is in the field of electronic reproduction technology and is directed to a method for engraving printing cylinders in an electronic engraving machine, whereby at least two engraving lanes that lie next to one another in axial direction are engraved on a printing cylinder with a respective engraving element.

DE-C-25 087 34 already discloses an electronic engraving machine for engraving printing cylinders with an engraving element. The engraving element, having an engraving stylus controlled by an engraving control signal as a cutting tool, for example in the form of a diamond, moves in the axial direction along a rotating printing cylinder. The engraving stylus cuts a sequence of cups arranged in a printing raster into the generated surface of the printing cylinder. The engraving control signal is formed in an engraving amplifier by superimposition of a periodic raster signal, also referred to as vibration, with image signal values that represent the printing densities between "light" and "dark" to be reproduced. Whereas the raster signal effects an oscillating lifting motion of the engraving stylus for engraving the cups arranged in the printing raster, the image signal values determine the cut depths of the engraved cups in conformity with the tonal values to be reproduced.

For magazine printing, a plurality of strip-shaped cylinder regions called engraving lanes that lie axially next to one another must be simultaneously engraved with a respective engraving element on a printing cylinder or on the printing cylinders of a color set that are successively engraved in one engraving machine or, on the other hand, simultaneously engraved in a plurality of engraving machines. For example, the various printed pages of a print job are produced in the individual engraving lanes. The engraving control signals for the individual engraving elements are thereby generated in separate electronic units, referred to as engraving channels.

A pre-requisite for a good reproduction quality is that the engraved printing densities in the individual engraving lanes coincide, i.e. that what is referred to as a lane equality is achieved. Even when the individual engraving channels are electrically balanced, the engraving styli often exhibit different degrees of wear. The result is that cups having different geometrical dimensions or volumes are engraved in the individual engraving lanes, as a result of which disturbing differences in printing density occur in the engraving lanes. Worn engraving styli also generate cups with a rougher inside surface, as a result of which the ink acceptance behavior in the printing machine and, thus, the printing density are varied. Different printing densities in the engraving lanes can also be attributed to influences in the printing machine, for example when the pressing power between printing cylinder and cooperating printing cylinder varies in the axial direction or when the doctor blade with which excess ink is stripped off does not lie against the printing cylinder with the same tightness everywhere.

In order to achieve identical printing densities in the engraving lanes, engraving styli having the same degree of wear are currently sought insofar as possible for the engraving. As a precautionary measure, the engraving styli are also replaced by new engraving styli after a specific number of operating hours, this being relatively involved and expensive.

Even when new engraving styli are employed, density differences due to engraved areas that differ in size can soon arise in the individual engraving lanes as can, connected therewith, wear of the engraving styli that occurs with differing repetity. Different engraving properties such as the hardness of the material and the cutting behavior of the engraving stylus in the material—whereby the material is generally copper—can, for example, arise due to a non-uniform galvanization of the printing cylinder.

The differences in printing density in the engraving lanes can occur with respect to one printing density value or with respect to a printing density range and can differ in size for each engraving lane. Additionally, the engraving properties can change at the circumference of the printing cylinder, so that differences in printing density can also occur within an engraving lane.

For matching such differences in printing density, the engraved printing cylinder is currently chemically post-processed in practice in a time-consuming and work-intensive work process, particularly given high quality commands made of the printed products printed with the cylinder.

SUMMARY OF THE INVENTION

It is an object of the invention to improve upon engraving of printing cylinders in an electronic engraving machine, wherein at least two engraving lanes are engraved with a respectively allocated engraving element on a printing cylinder, such that disturbing differences in printing density are automatically compensated in the engraving lanes.

In accordance with a method of the invention for engraving printing cylinders in an electronic engraving machine, printing densities in the individual engraving lanes are matched by engraving cups in the printing lanes with which the prescribed characteristic rated printing densities are to be achieved. The actual printing densities achieved are identified by measurement after the printing. A corrected lane calibration is derived for the respective engraving lane from deviations between the rated printing densities and the actual printing densities. The allocated, corrected lane calibration is applied in the engraving lanes.

DESCRIPTION OF THE PREFERRED EMBODIMENTS

Figure 1:
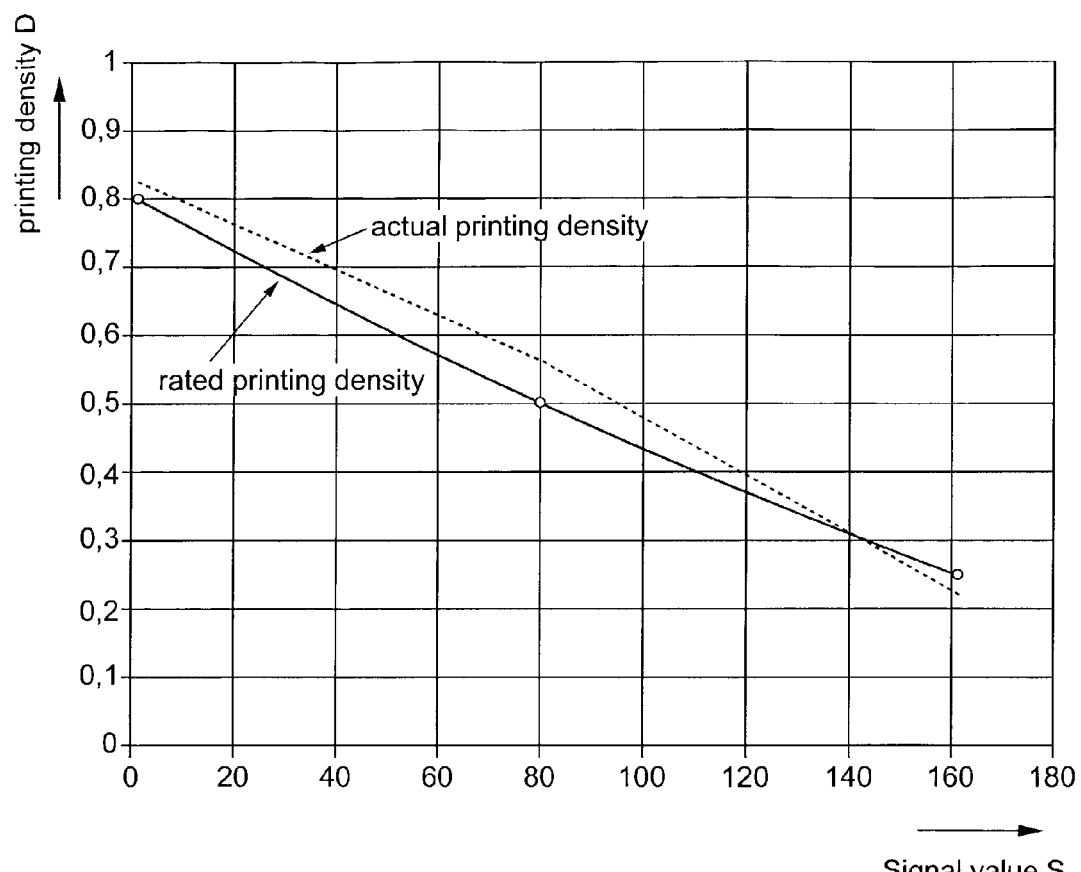
FIG. 1 shows the relationship between signal value and printing density for three characteristic rated density values.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

According to the prior art, rated printed densities $D_{rated}$ for characteristic tonal values of a test wedge to be engraved are prescribed in every engraving lane of a printing cylinder for calibrating the printing density D. The test wedge, for example, comprises three characteristic tonal values having the rated printed densities $D_{rated}$=(0.25; 0.5; 0.8). The signal values S=(161; 80; 1) with which the engraving system is driven belong thereto. FIG. 1 shows the relationship between the signal values S and the printing densities D. A test wedge with the prescribed signal values S is engraved in each engraving lane on a printing cylinder. The engraving of the test wedges on the printing cylinder can occur separately from or simultaneously with the engraving of the actual printing form in cylinder regions lying outside the printing form. Likewise, regions of the production engraving can also be utilized for the calibration when they contain the characteristic tonal values. After the engraving of the printing cylinder, the engraved printing cylinder is proof printed in a printing machine. In the proof printing, the actual printing densities $D_{actual}$ achieved for the test wedges engraved in the individual engraving lanes are measured with a suitable density measuring instrument, and the deviations from the rated printed densities $D_{rated}$ are identified (FIG. 1). These deviations are compensated in the individual engraving lanes with a suitable calibration of the transfer function of the engraving systems, for example by setting the signal gain and the activation point of the amplification of the engraving systems.

Figure 2:
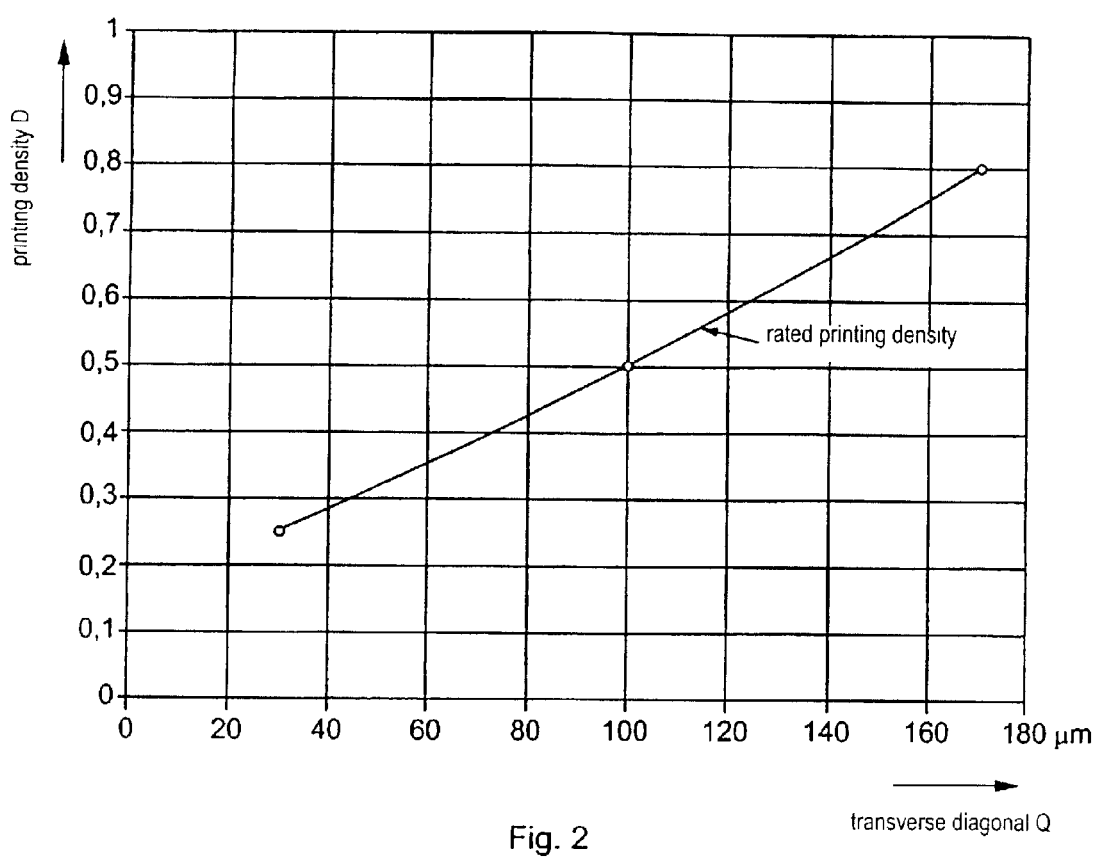
FIG. 2 shows the relationship between the rated density values and the rated transverse diagonals corresponding to them (standard calibration function)

Since new proof prints cannot be constantly made for reasons of expense during the setting of the engraving systems in order to identify the actual printing densities $D_{actual}$ that have already been achieved, the actual printing densities $D_{actual}$ are derived from the measurement of geometry values of the engraved test wedge cups. Rated geometry values that define the desired shape and size of the cups to be engraved correspond to the prescribed rated density values $D_{rated}$. Geometry values can be the longitudinal diagonals, the transverse diagonals, the areas or volumes of the cups dependent on which measuring method is employed for measuring the engraved cup size. Preferably, the transverse diagonals of the cups are utilized since they are simple to measure. FIG. 2 shows the relationship between the rated printing densities $D_{rated}$ and the rated transverse diagonals $Q_{rated}$ of the cups corresponding to them. Given the standard collaboration function, the rated transverse diagonals $Q_{rated}$=(30 µm; 100 µm; 170 µm) correspond to the characteristic rated printing densities $D_{rated}$=(0.25; 0.5; 0.8).

The rated printing densities $D_{rated}$ are converted into the corresponding signal values for driving the engraving amplifiers allocated to the individual engraving lanes, the engraving control signals for controlling the engraving styli of the engraving elements being generated in the engraving amplifiers. The actual geometry values of the cups that are achieved are measured in every engraved test wedge of an engraving lane. The measurement of the geometry values can occur with the assistance of a measuring microscope or in a video image registered by a video camera. The engraving systems of the individual engraving lanes are set such that the actual geometry values reach the rated geometry values that correspond to the prescribed rated printing densities.

Figure 3:
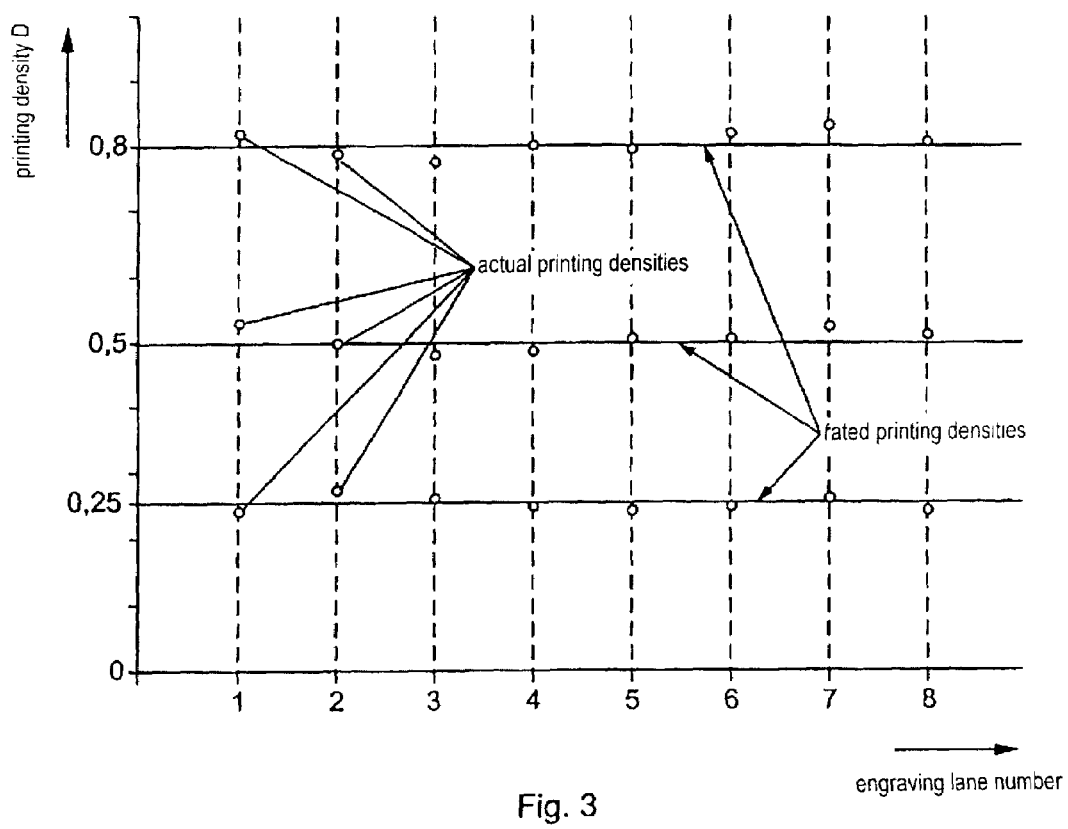
FIG. 3 illustrates the residual deviations of the actual printing densities for three characteristic tonal values and for the individual engraving lanes.

A standard calibration function between the rated printing densities $D_{rated}$ and, for example, the rated transverse diagonals $Q_{rated}$ corresponding to them (FIG. 2) is employed for this collaboration according to the prior art, the rated transverse diagonals $Q_{rated}$ having been determined for a new engraving stylus and having been defined by averaging over a plurality of engraved test wedges and proof printings. The result thereof is that the influences differing from engraving lane to engraving lane that were initially explained such as degree of wear of the engraving stylus, ink acceptance behavior, hardness of the material, cutting behavior, etc., are not taken into consideration in the collaboration. After the collaboration, the actual printing densities $D_{actual}$ in the individual engraving lanes can therefore still deviate from the rated printing densities $D_{rated}$. FIG. 3 shows these residual deviations of the actual print densities $D_{actual}$ for the three characteristic tonal values and for the individual engraving lanes.

Figure 4:
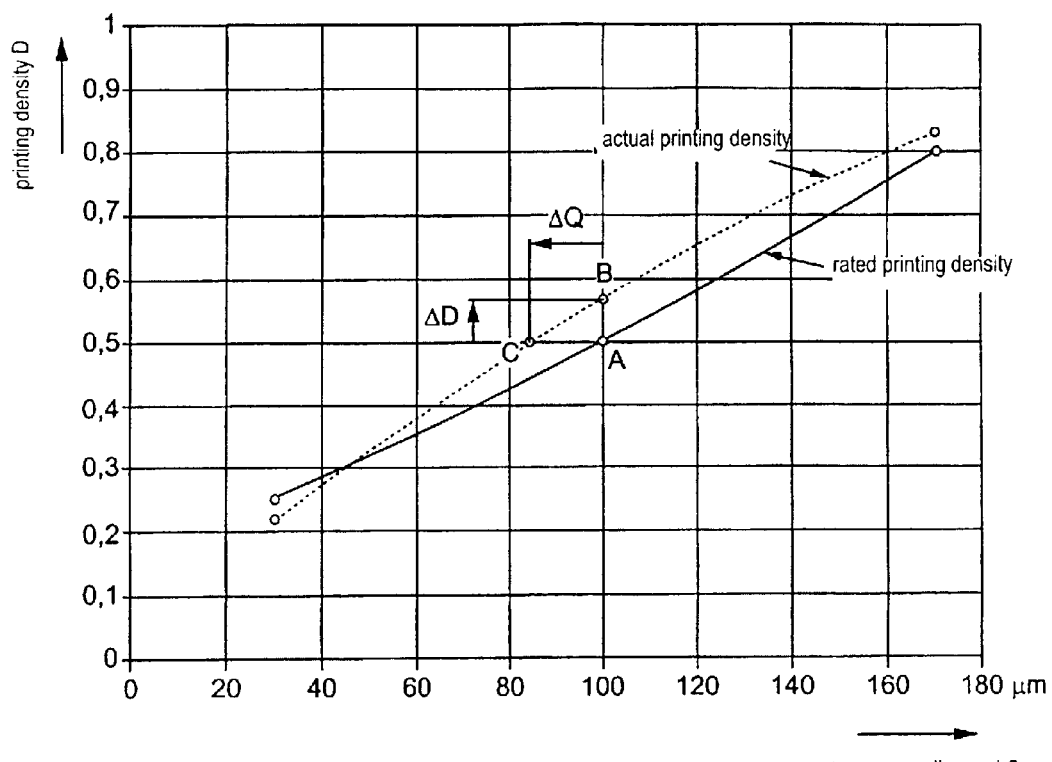
FIG. 4 shows the residual deviations between actual printing densities and rated printing densities in an engraving lane.
Figure 5:
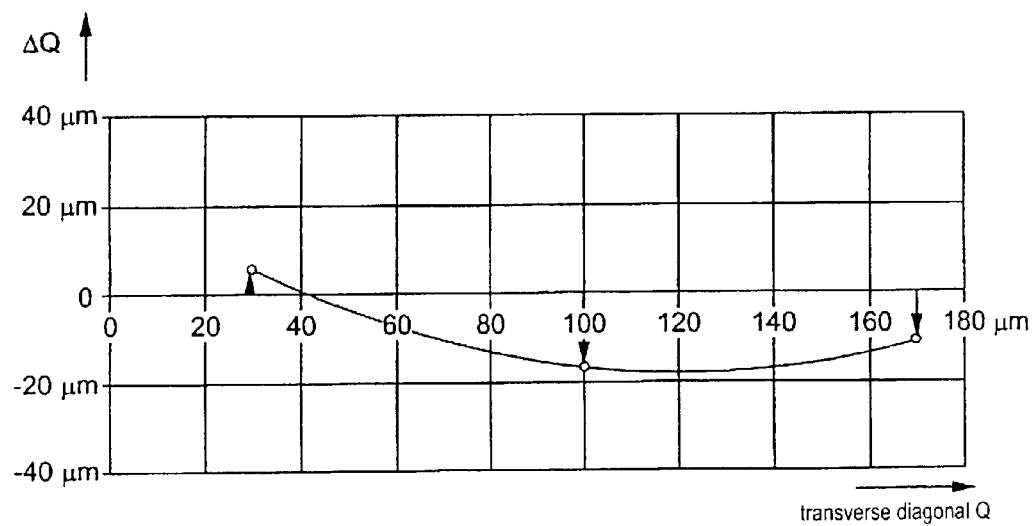
FIG. 5 illustrates the correction function $\Delta Q = f(Q)$ for an engraving lane.
Figure 6:
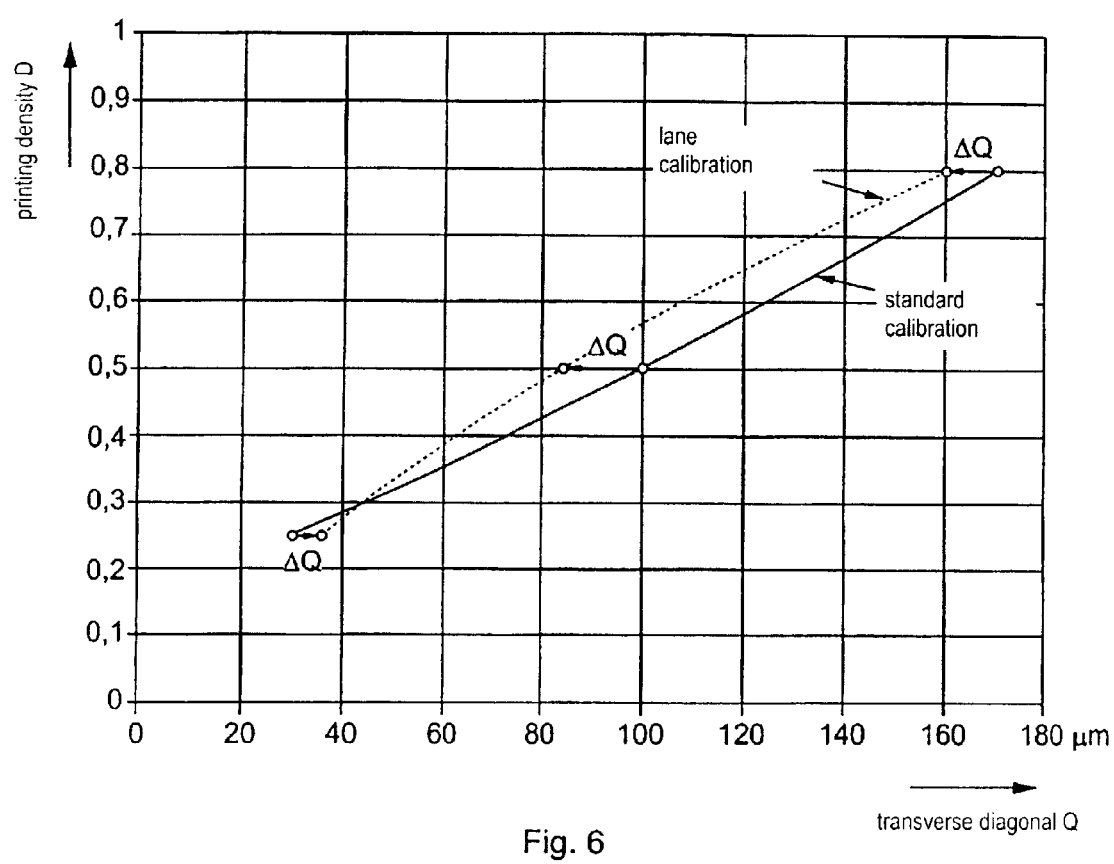
FIG. 6 shows the corrected calibration function for an engraving lane.

In the method disclosed, of the preferred embodiment, correction values are derived from the residual deviations for the individual engraving lanes, said correction values being taken into consideration in the next engraving of a printing cylinder with the same engraving system in the respective engraving lane in the collaboration, so that the calibration takes the lane-individual influences and differences into consideration, and, thus, the rated printed densities are achieved more dependably and more exactly in all engraving lanes. The method is explained below with reference to the example of engraving lane number 1. For this purpose, FIG. 4 shows the rated printing densities $D_{rated}$ and the actual printing densities $D_{actual}$ achieved in this engraving lane after the standard calibration dependent on the transverse diagonals Q. The residual deviations between rated printing densities $D_{rated}$ and actual printing densities $D_{actual}$ has been entered highly exaggerated in FIG. 4 in order to be able to clearly present a preferred embodiment of the method. According to the standard calibration, a transverse diagonal of $Q_{rated}$=100 µm is set (Point A) for the value $D_{rated}$=0.5 of the rated printing density. The actual printing density $D_{actual}$ achieved therewith is higher by the residual deviation ΔD (Point B). Corresponding deviations derive for the other characteristic tonal values for which the transverse diagonals $Q_{rated}$=30 µm or, respectively, $Q_{rated}$=170 µm had been set in the engraving. When the points of the actual printing densities $D_{actual}$ that are achieved for the three characters to tonal values are connected in this diagram, then the broken-line curve of the actual printing density is obtained. According to the curve of the actual printing densities, the rated printing density value $D_{rated}$=0.5 is achieved in Point C, i.e. with a transverse diagonal deviating by ΔQ=−16 µm. Thus when the corrected transverse diagonal $Q_{corr}$=100 µm+ΔQ=84 µm is set for the rated printing density value $D_{rated}$=0.5 in the next engraving in this engraving lane, the rated printing density value $D_{rated}$ is exactly achieved or is at least achieved with far greater precision. Based on the same consideration, correction values ΔQ for the various values of the transverse diagonals can be derived from the comparison of the curves for the rated printing density $D_{rated}$ and actual printing density $D_{actual}$. An individual correction function $\Delta Q=f(Q)$ ultimately derives therefrom for each engraving lane, this being shown in FIG. 5 for the example under consideration. This correction function can also be immediately taken into consideration in the standard calibration function according to FIG. 2 as well, as a result of which a lane calibration function is obtained that is employed in the next production engraving for this engraving lane (FIG. 6).

The actual printing densities $D_{actual}$ achieved with the cups engraved in the test wedges and the potentially remaining residual deviations relative to the rated printing densities $D_{rated}$ are identified in (FIG. 3) after one or more renewed production engravings of a printing cylinder with the same engraving systems in the individual engraving lanes or are also identified at certain regular time intervals. In the way set forth above, an improved lane calibration function is calculated therefrom (FIG. 6), this then being employed in the following production engravings. Expediently, the calculation of a new lane calibration occurs when the residual deviations between the rated printing densities $D_{rated}$ and the actual printing densities $D_{actual}$ have exceeded a prescribed tolerance limit. The calibration of the engraving lanes thus occurs in a process of "self-learning" wherein the settings of the engraving amplifiers in the individual engraving channels are continuously optimally adapted to the varying technical boundary conditions such as, for example, differing degrees of wear of the engraving styli employed.

The calibration method preferred embodiment for density matching of the engraved lanes has been explained with reference to the example of setting the engraving channels with the transverse diagonals of the engraved cups. The method can be implemented in the same way when the transverse diagonal is replaced by some other geometry value of the engraved test wedge cups, for example the longitudinal diagonals, the area or the volume of the cups. Analogous to the relationship of FIG. 2, a standard calibration function is employed for this purpose that places the geometry value employed into relationship with the rated printing densities $D_{rated}$. After setting the rated geometry values according to this standard calibration function, the actual printing densities $D_{actual}$ of the engraved test wedges are measured, and individual corrections of the geometry value employed are derived therefrom for the individual engraving lanes in order to erect a lane calibration function (analogous to FIG. 4 and FIG. 5).

An improved precision of the calibration method example provided can be achieved when the setting of the geometry value employed occurs not only for the three characteristic rated printing densities but also occurs for further intermediate stages, for example for tonal values in a graduation of 10% between light and dark.

Figure 7:
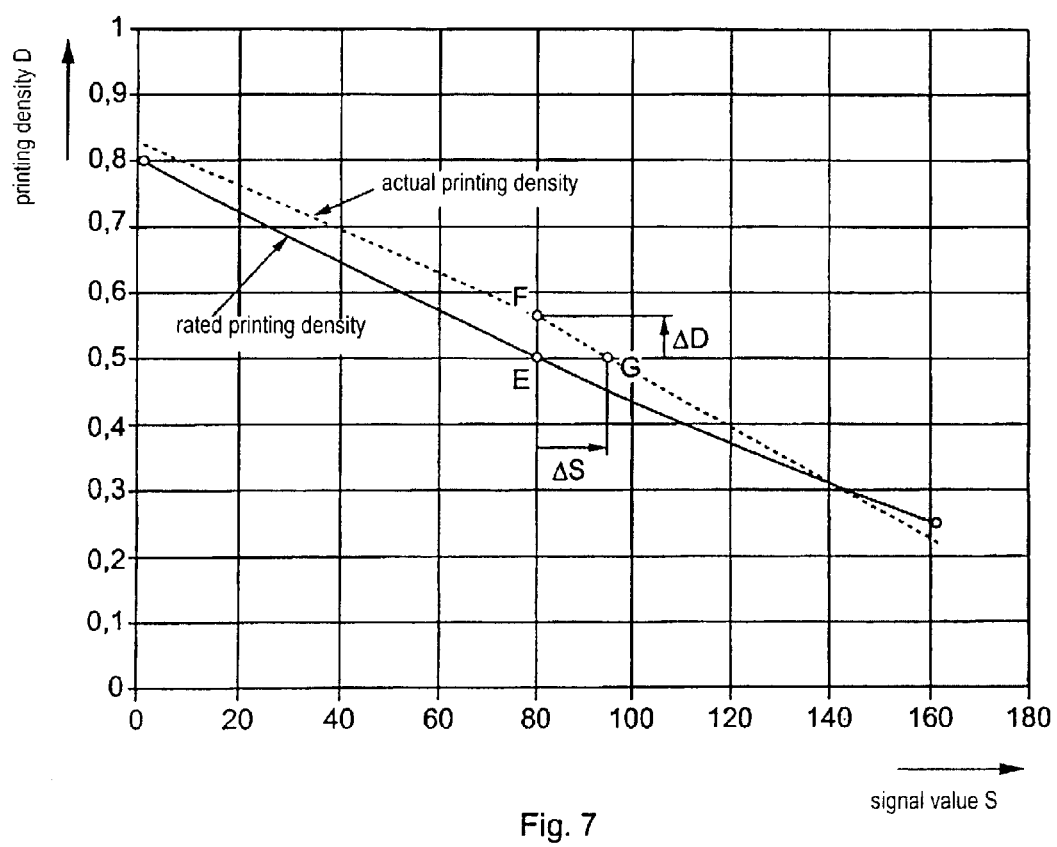
FIG. 7 illustrates the correction of the signal values.
Figure 8:
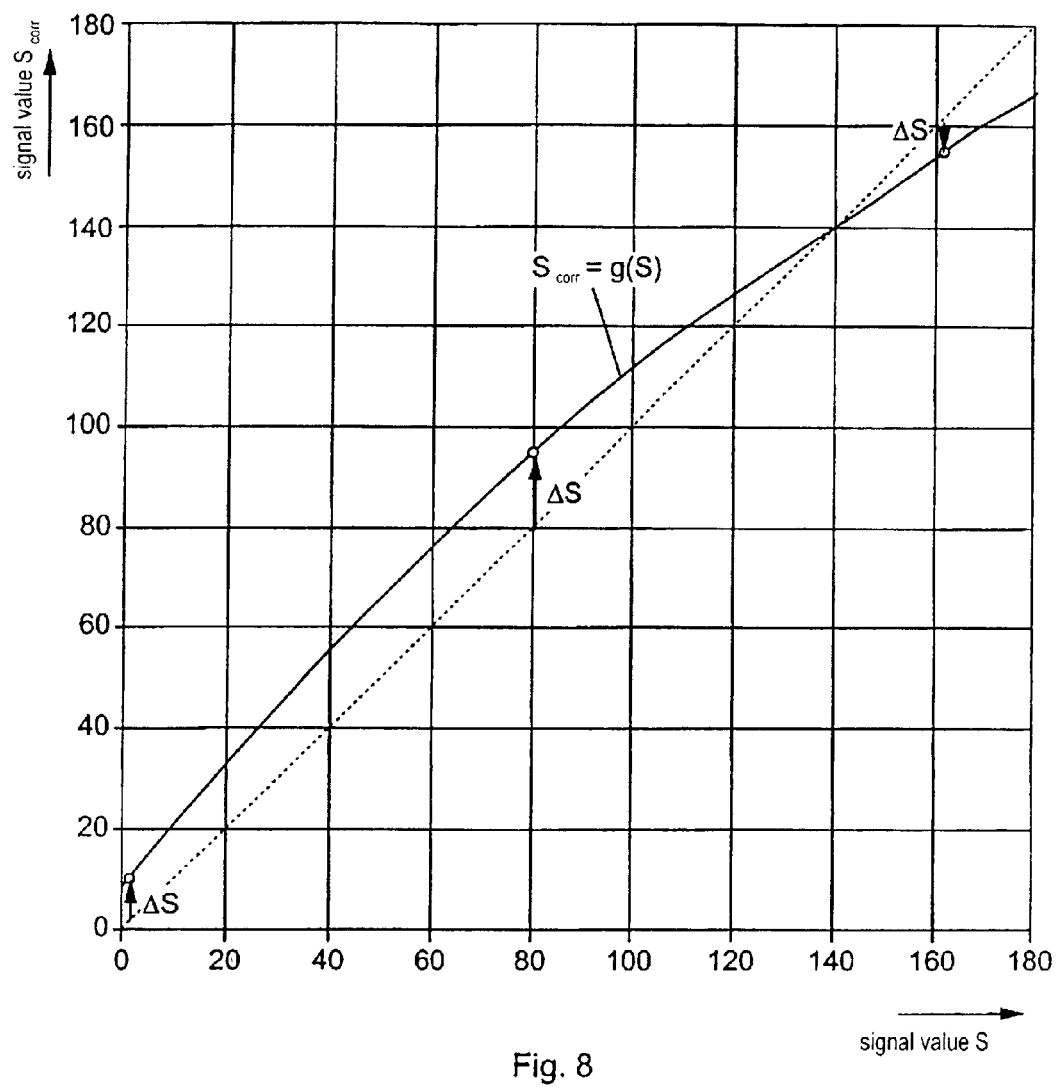
FIG. 8 shows the allocation between signal values and corrected signal values.

In another embodiment of the calibration method, the signal values S with which the engraving channels are driven are individually corrected for every individual lane instead of the geometry value employed. This is illustrated in FIG. 7 that shows the relationship between the signal values S and the printing densities D (see FIG. 1). The rated printing densities $D_{rated}$ and the actual printing densities $D_{actual}$ achieved in a specific engraving lane following the standard calibration are entered dependent on the drive signal values S. A signal value S=80 (Point E) was applied for driving for the value $D_{rated}=0.5$ of the rated printing density. The actual printing density thus achieved is higher by the residual deviation $\Delta D$ (Point F). Corresponding deviations derived for the other characteristics tonal values for which the signal values S=1 or, respectively, S=161 had been applied in the engraving. When the points of the actual printing densities $D_{actual}$ that were achieved for the three characteristic tonal values are connected in this diagram, then the broken-line curve of the actual printing densities is obtained. According to the curve of the actual printing densities, the rated printing density value $D_{rated}=0.5$ is reached in the Point G, i.e. with a signal value deviating by $\Delta S=15$. Thus when the corrected signal value $S_{corr}=80+\Delta S=95$ is applied in the next engraving in this engraving lane for the rated printing density value $D_{rated}=0.5$, the rated printing density value $D_{rated}$ is exactly achieved or is at least achieved with far greater precision. Based on the same consideration, correction values $\Delta S$ for all signal values S can be derived from the comparison of the curves for the rated printing density $D_{rated}$ and the actual printing density $D_{actual}$. An individual correction function $S_{corr}=g(S)$ for the signal values ultimately derives therefrom for each engraving lane, this being shown in FIG. 8 for the example under consideration. This correction function can, for example, be realized by a table memory in each engraving channel, a corrected signal value $S_{corr}$ being allocated to every input signal value S therewith. In this embodiment of the calibration method, care must be exercised to see that the actual printing density $D_{actual}$ for the smallest signal values S has values that are higher than or equal to the rated printing density $D_{rated}$, since negative signal values would otherwise have to be generated by the calibration. This condition can be assured, for example, by an enhanced pigmentation of the ink, whereby the pigmentation of the ink must be enhanced to such an extent that the above condition is met in all lanes.

In another development of the calibration method, the time variation of the residual deviations between actual printing density $D_{actual}$ and rated printing density $D_{rated}$ in the individual engraving lanes is additionally taken into consideration in order to make a prediction about the anticipated residual deviations and, thus, about the anticipated changes in the lane calibration function. One reason for the time variation is the progressive wear of the engraving stylus with age or the frequency with which the engraving stylus is used. Different degrees of wear of the engraving styli can be caused in that areas of different size were previously engraved in the engraving lanes and/or the engraving lanes exhibit different engraving properties that, for example, are to be attributed to a non-uniform galvanization of the printing cylinder.

Figure 9:
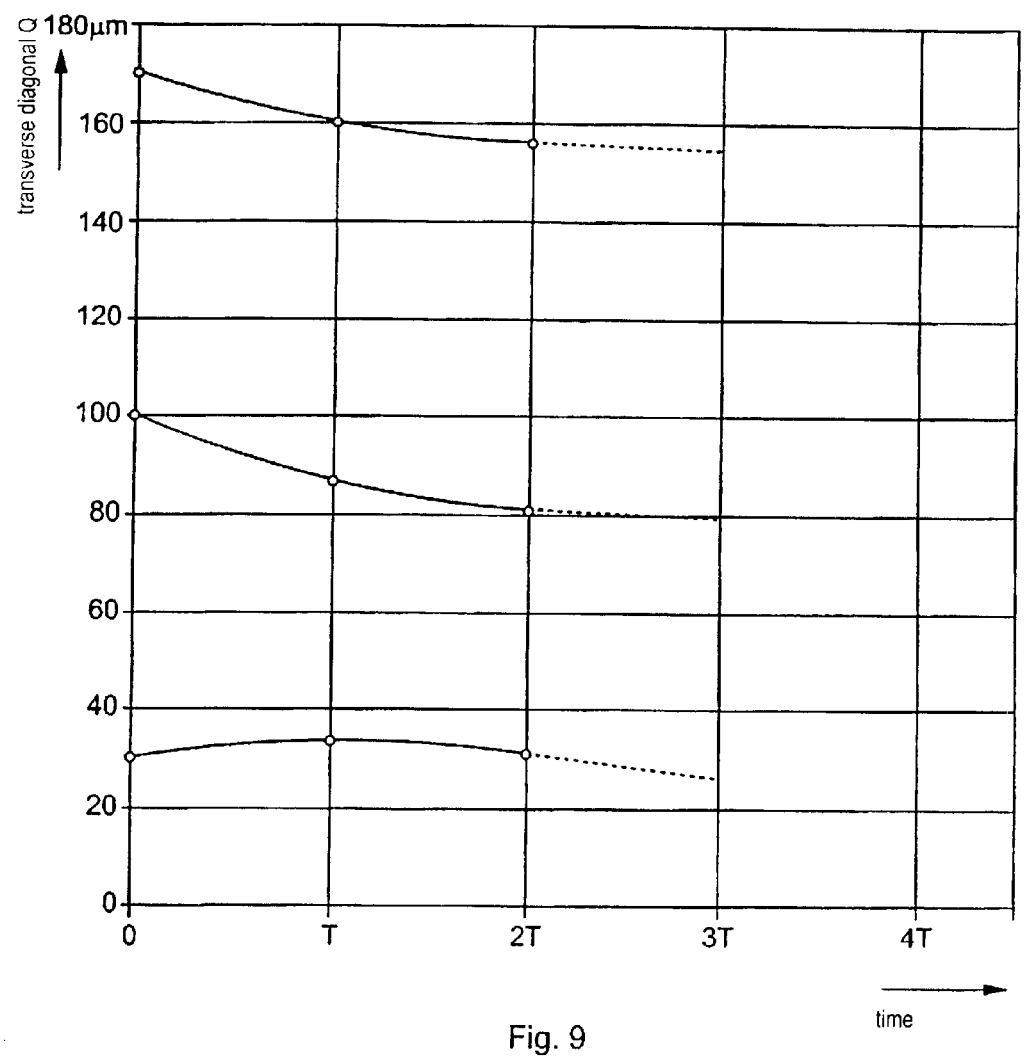
FIG. 9 illustrates the variation of the geometry values over time.

FIG. 9 shows the time dependency for a lane of the transverse diagonals Q for the three characteristic tonal values to be set in the lane calibration according to the method. It is assumed that the transverse diagonals Q to be set were already redetermined at the respective time interval T for two matching periods of the lane calibration. A prediction for the variation of the transverse diagonals Q to be set in the next engravings can then be made (broken-line part of the curves) from the slope that the curves have been reached at time 2T, the exact values being in turn determined from the measurement of the actual printing densities $D_{actual}$ by time 3T. As a result of this extrapolation, the measurement and matching of the lane calibration need not be implemented as often. Instead of being entered dependent on the time, the variation of the geometry values relevant for the calibration can also be entered, for example, dependent on the frequency with which the engraving styli are used in order to derive the prediction about the setting values for the next engravings. The frequency of the use can, for example, be measured in that the cumulated number of engraved cups is summed up in a counter that is present in every engraving channel. Alternatively, this number can also be determined in the control software and stored.

In an advantageous embodiment, the measurements of the actual printing densities and the geometry values that are set are undertaken by automatic measuring devices. It is also advantageous to store and administer the measured values and the identified setting values for the individual lane calibrations as well as the time dependencies and development tendencies in a central computer, so that the density match in between the individual engraving lanes automatically sequence it and is also automatically adapted to the change in technical boundary conditions over a longer time.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

The invention claimed is:

1. A method for engraving printing cylinders in an electronic engraving machine, comprising the steps of:
    engraving at least two engraving lanes that lie next to one another in an axial direction on a printing cylinder with a respectively allocated engraving element;
    generating signal values that represent rated density values to be achieved for drive of the engraving elements;
    with the engraving elements driven with the signal values engraving cups into the printing cylinder whose geometry values represent actual printing densities that have been achieved;
    prescribing a standard calibration function that describes a relationship between the geometry values and the rated printing densities;
    calibrating electrical properties of the engraving elements such that, given drive of the engraving elements with signal values belonging to characteristic rated printing densities, cups having geometry values prescribed by the standard calibration function are engraved; and
    matching the printing densities in the individual engraving lanes by
        engraving cups in the printing lanes with which the prescribed, characteristic rated printing densities are to be achieved,
        identifying the actual printing densities achieved by measurement after the printing,
        deriving a corrected lane calibration for the respective engraving lane from deviations between the rated printing densities and the actual printing densities, and
        applying the allocated, corrected lane calibration in the engraving lanes.

2. The method according to claim 1 wherein the corrected lane calibration is generated by determining corrected geometry values for the rated printing densities in the standard calibration function.

3. The method according to claim 1 wherein the geometry values of a cup are at least one of transverse diagonals, longitudinal diagonals, cup area and cup volume.

4. The method according to claim 1 wherein the corrected lane calibration is generated in that corrected signal values are determined for the signal values.

5. The method according to claim 1 wherein improved corrected lane calibrations are determined anew when deviations between the rated printing densities and the actual printing densities exceed a tolerance limit.

6. The method according to claim 1 wherein improved, corrected lane calibrations are determined anew after a prescribed time interval after a prescribed number of engraved printing cylinders or after a prescribed frequency of use of the engraving element.

7. The method of claim 4 wherein improved, corrected lane calibrations are determined by extrapolation from a time variation of the determined, corrected geometry values or the corrected signal values.

8. The method according to claim 1 wherein the measurement of the actual printing densities and of the geometry values is implemented by automatic measurement devices.

9. The method according to claim 1 wherein said measurements and the derived corrected lane calibration as well as time dependencies are stored and administered in a central computer.

10. The method according to claim 1 wherein corrected lane calibrations are continuously automatically adapted to varying properties of the engraving elements and of the engraving lanes.

11. A method for engraving printing cylinders in an electronic engraving machine, comprising the steps of:
    engraving at least two engraving lanes on a printing cylinder with a respectively allocated engraving element;
    generating signal values that represent rated density values to be achieved for drive of the allocate engraving element;
    with the engraving elements driven with the signal values engraving cups into the printing cylinder whose geometry values represent actual printing densities that have been achieved;
    prescribing a standard calibration function that describes a relationship between the geometry values and the rated printing densities;
    calibrating electrical properties of the engraving elements such that, given drive of the engraving elements with signal values belonging to characteristic rated printing densities, cups having geometry values prescribed by the standard calibration function are engraved; and
    matching the printing densities in the individual engraving lanes by
        engraving cups in the printing lanes with which the prescribed, characteristic rated printing densities are to be achieved,
        identifying the actual printing densities achieved by measurement after the printing,
        deriving a corrected lane calibration for the respective engraving lane from deviations between the rated printing densities and the actual printing densities, and
        applying the respective corrected lane calibration in the engraving lanes.

* * * * *